(12) United States Patent
Akirav et al.

(10) Patent No.: US 9,697,223 B2
(45) Date of Patent: Jul. 4, 2017

(54) PROVIDING IDENTIFIERS TO DATA FILES IN A DATA DEDUPLICATION SYSTEM

(71) Applicant: INTERNATIONAL BUSINESS MACHINES CORPORATION, Armonk, NY (US)

(72) Inventors: Shay H. Akirav, Petach-Tikva (IL); Lior Aronovich, Thornhill (CA); Rafael Buchbinder, Tel Aviv (IL); Ariel J. Ish-Shalom, Tel Aviv (IL); Lior Tamary, Omer (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 612 days.

(21) Appl. No.: 13/937,090

(22) Filed: Jul. 8, 2013

(65) Prior Publication Data

US 2015/0012504 A1    Jan. 8, 2015

(51) Int. Cl.
  *G06F 7/00* (2006.01)
  *G06F 17/00* (2006.01)
  *G06F 17/30* (2006.01)

(52) U.S. Cl.
  CPC .............. *G06F 17/30156* (2013.01)

(58) Field of Classification Search
  CPC ................................. G06F 17/30156
  USPC ......................................... 707/692
  See application file for complete search history.

(56) References Cited

U.S. PATENT DOCUMENTS

2013/0073519 A1\* 3/2013 Lewis ............... G06F 17/30215
  707/610

\* cited by examiner

*Primary Examiner* — Van Oberly
(74) *Attorney, Agent, or Firm* — Griffiths & Seaton PLLC

(57) ABSTRACT

Data file in the data deduplication system are associated with a file identifier defined to have a first part identifier for denoting a location of the data file in a storage, and a second part identifier for uniquely identifying the data file in the data deduplication system over time.

17 Claims, 5 Drawing Sheets

PROVIDING IDENTIFIERS TO DATA FILES IN A DATA DEDUPLICATION SYSTEM

BACKGROUND OF THE INVENTION

Field of the Invention

The present invention relates in general to computers, and more particularly to providing identifiers to data files in a data deduplication system in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data are copied again and again, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

In one embodiment, a method is provided for providing identifiers to data files in a data deduplication system using a processor device in a computing environment. In one embodiment, by way of example only, the method associates a data file in the data deduplication system with a file identifier defined to have a first part identifier for denoting a location of the data file in a storage, and a second part identifier for uniquely identifying the data file in the data deduplication system over time.

In another embodiment, a computer system is provided for providing identifiers to data files in a data deduplication system using a processor device, in a computing environment. The computer system includes a computer-readable medium and a processor in operable communication with the computer-readable medium. In one embodiment, by way of example only, the processor, associates a data file in the data deduplication system with a file identifier defined to have a first part identifier for denoting a location of the data file in a storage, and a second part identifier for uniquely identifying the data file in the data deduplication system over time.

In a further embodiment, a computer program product is provided for providing identifiers to data files in a data deduplication system using a processor device, in a computing environment. The computer-readable storage medium has computer-readable program code portions stored thereon. The computer-readable program code portions include a first executable portion that associates a data file in the data deduplication system with a file identifier defined to have a first part identifier for denoting a location of the data file in a storage, and a second part identifier for uniquely identifying the data file in the data deduplication system over time.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
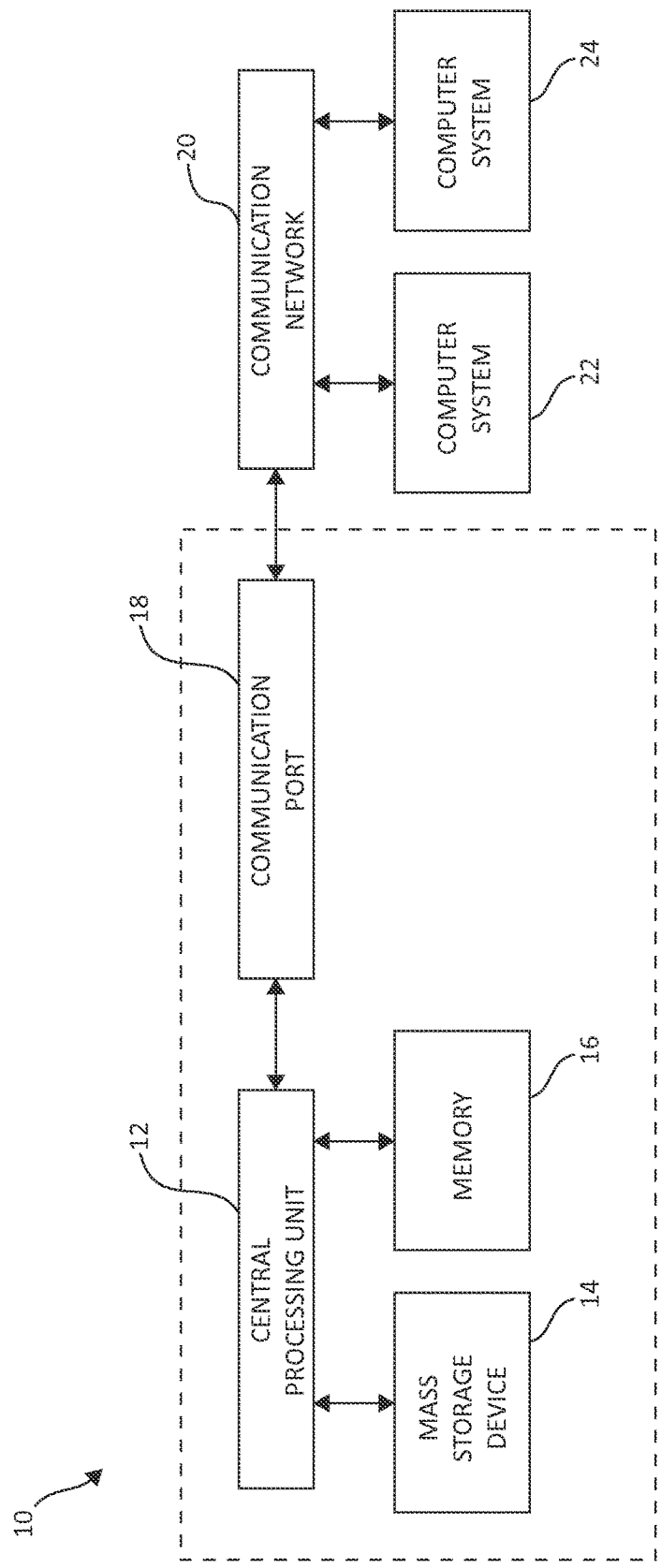
FIG. 1 is a block diagram illustrating a computing system environment having an example storage device in which aspects of the present invention may be realized.

Data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. A significant challenge in deduplication storage systems is scaling to support very large repositories of data. Such large repositories can reach sizes of Petabytes (1 Petabyte=$2^{50}$ bytes) or more. Deduplication storage systems supporting such repository sizes, must provide efficient processing for finding duplicate data patterns within the repositories, where efficiency is measured in resource consumption for achieving deduplication (resources may be CPU cycles, RAM storage, persistent storage, networking, etc.). In one embodiment, a deduplication storage system may be based on maintaining a search optimized index of values known as fingerprints or digests, where a (small) fingerprint represents a (larger) block of data in the repository. The fingerprint values may be cryptographic hash values calculated based on the blocks' data. In one embodiment, secure hash algorithm (SHA), e.g. SHA-1 or SHA-256, which are a family of cryptographic hash functions, may be used. Identifying fingerprint matches, using index lookup, enables to store references to data that already exists in a repository. In one embodiment, block boundaries may be determined based on the data itself. In other words, in one embodiment, a fundamental technique underlying deduplication storage systems is a method of segmenting the data into variable sized blocks (e.g. of mean sizes ranging from 4 KB to 64 KB), where the blocks' boundaries are dependent on the data itself. After segmenting the data into such blocks, identification values known as digests or fingerprints are associated with each block of data. The digest values are commonly cryptographic hash values calculated based on the blocks' data. Thus, as mentioned above, functions that are widely used are SHA-1 or SHA-256, and the size of a digest value typically ranges from 16 bytes to 64 bytes. Then, given new input data, the digest values of the input data are searched in a repository to find matching digest values of data already stored in the repository. This enables to identify data matches, and achieve data deduplication.

In one embodiment, a main benefit of having the blocks' boundaries dependent on the data itself is that such segmentations are robust to changes in the data, specifically insertions and deletions. Namely, if the data is segmented in a way that is not data dependent (e.g. fixed size blocks), then an insertion or deletion of even a single byte somewhere in the data will change the contents of many of the data blocks and therefore change their respective digest (hash) values, thus considerably reducing deduplication effectiveness. If, on the other hand, the blocks' boundaries depend on the data itself, then insertions and deletions affect only a local range of blocks encompassing these modifications, thus enabling effective deduplication.

In one embodiment, a deduplication system may partition the data into high level 16 MB chunks, and then apply a further segmentation into blocks within each chunk. The deduplication system may support large-scale repositories (e.g. of 1PB physical or more), and may have an internal deduplication file system supporting a very large number of deduplicated data files. Each of the deduplicated data files is assigned with an identifier used by the various system modules. In one embodiment, the deduplication mechanism of the deduplication system maintains a compact similarity index, facilitating scalability, which requires the file identifiers to be compact (e.g. no more than 4 bytes). Therefore, file identifiers of files that are deleted, are reused for new files. However, one of the challenges of this mechanism is that during the process of creating data matches using reference data or digests of the data, that is loaded in memory, a data file from which this information was read can be deleted during this operation (since deletion should not be delayed), and its identifier may be reused for a new file with different data. The result of this scenario is creation of false data matches (i.e. to a different reference file than the original reference file), resulting in data corruption.

Thus, provides increased efficiency in a deduplication system and addresses this challenge by providing reference file identifiers in a data deduplication system using a processor device in a computing environment. In one embodiment, by way of example only, the present invention associates a data file in the data deduplication system with a file identifier defined to have a first part identifier for denoting a location of the data file in a storage, and a second part identifier for uniquely identifying the data file in the data deduplication system over time.

In one embodiment, the present invention defines an identifier of a data file in the deduplication file system to have two parts—a part identifier that is reused in file deletion (Compact ID) and a unique part identifier (UID). In other words the first part identifier is the compact ID for denoting a location of the data file and for recycling after deletion of the data file, and the second part identifier is the UID for preventing false data matches between the data file and an original reference data file. In one embodiment, by way of example only, the compact ID is an address that is capable of being recycled and reused. The reused part identifier is stored in a deduplication similarity index, and used to access files for reading reference data or digests, which are identified as similar to input data by a similarity search process. This enables to keep the similarity index compact.

In one embodiment, a counter is used for creation of new UID(s). In the process of reading reference data or digests the UID of a data file to which the data or digest belong is read from the deduplication file system. In case of digests, the UID is specified within the digest file.

The UID is not stored in the similarity index, but stored only in memory as long as the reference data and/or the digests of a specific file are maintained in memory. When data matches, which are created for input data, are considered for deduplicated storage of the input data, the UID's attached to the data matches are verified against the unique identifiers or the files specified as reference files by the reused identifiers. In one embodiment, the present invention, by creating and using the file identifiers, prevents usage of false data matches and prevents data corruption, enables non-deferred deletion of files, and keeps the similarity index compact, thus supporting a deduplication system scalability.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
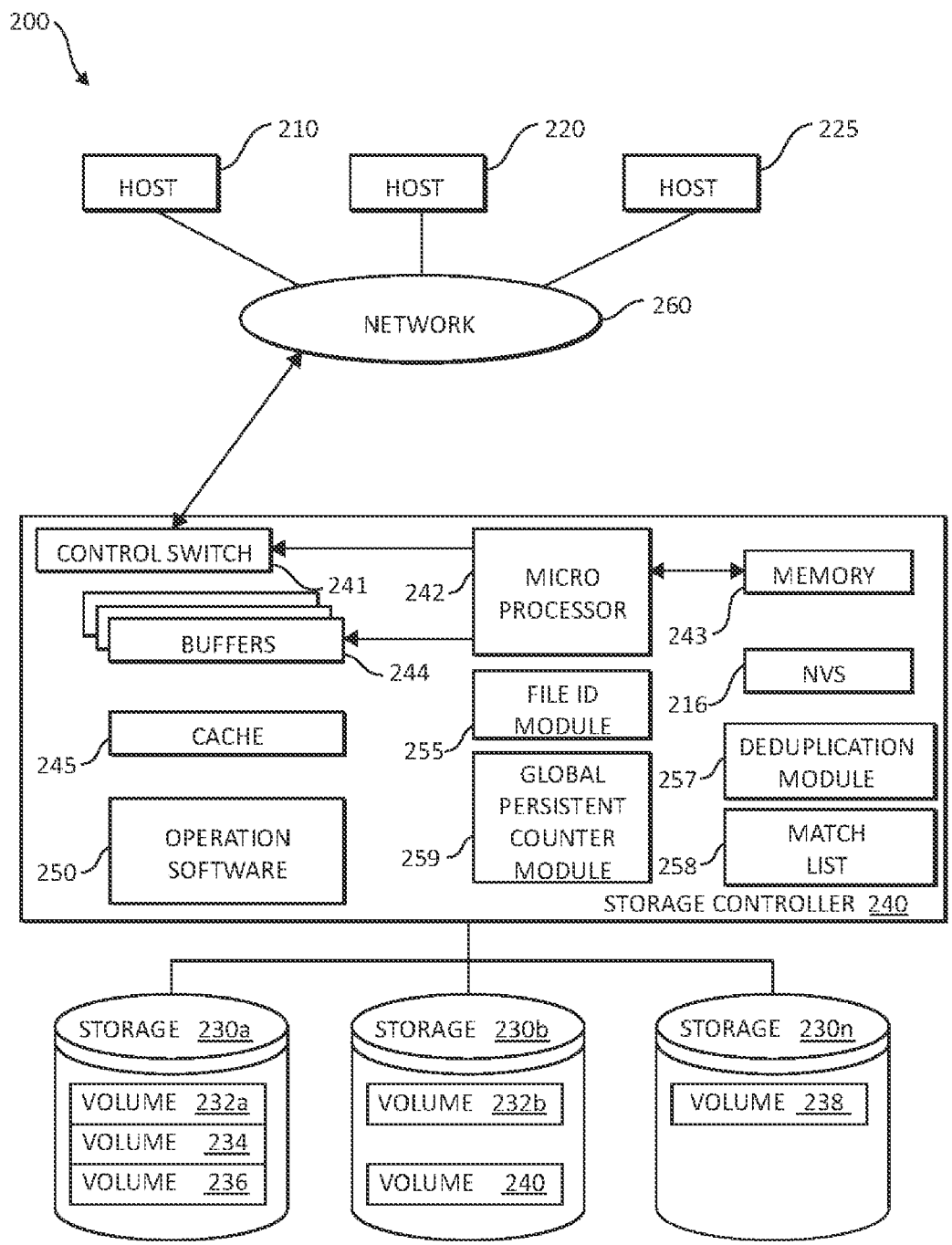
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part identifier of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® Protec-TIER® deduplication system TS7650G™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a file identifier (ID) module 255, a deduplication module 257, a data/digest match list 258, and a global persistent counter module 259. The file identifier (ID) module 255, the deduplication module 257, the data/digest match list 258, and the global persistent counter module 259 may work in conjunction with each and every component of the storage controller 240, the hosts 210, 220, 225, and storage devices 230. The file identifier (ID) module 255, the deduplication module 257, the data/digest match list 258, and the global persistent counter module 259 may be structurally one complete module or may be associated and/or included with other individual modules. The file identifier (ID) module 255, the deduplication module 257, the data/digest match list 258, and the global persistent counter module 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255, the similarity index module 257, and the similarity search module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, file identifier (ID) module 255, the deduplication module 257, the data/digest match list 258, and the global persistent counter module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention. As mentioned above, the file identifier (ID) module 255, the deduplication module 257, the data/digest match list 258, and the global persistent counter module 259 may also be located in the cache 245 or other components. As such, the file identifier (ID) module 255, the deduplication module 257, the data/digest match list 258, and the global persistent counter module 259 maybe used as needed, based upon the storage architecture and users preferences.

Figure 3:
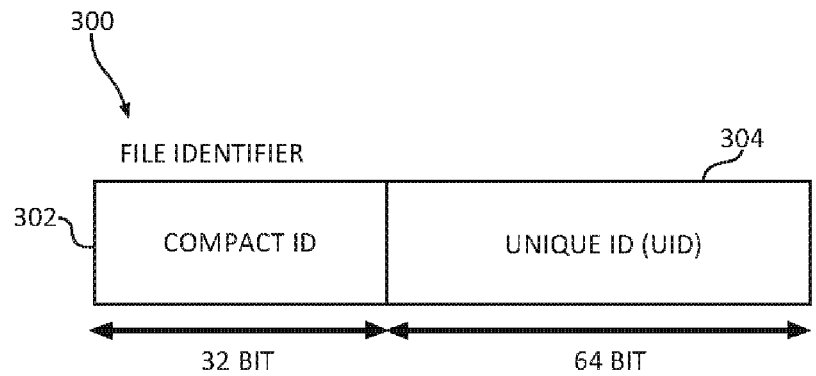
FIG. 3 is a block diagram illustrating an exemplary file identifier layout in which aspects of the present invention may be realized.

FIG. 3 is a block diagram illustrating an exemplary file identifier layout in which aspects of the present invention may be realized. In one embodiment, the file identifier includes a combination of a compact identifier (ID) 302 and a unique identifier (UID) 304. The file identifier 300 is defined to have a first part identifier 302 for denoting a location of the data file in a storage, and a second part identifier 304 for uniquely identifying the data file in the data deduplication system over time. The file Identifier 300 is a combination of a Compact ID 302 and a Unique ID 304. The Compact ID is a 32-bit integer, which denotes the location of a file in the deduplication file system.

Figure 4:
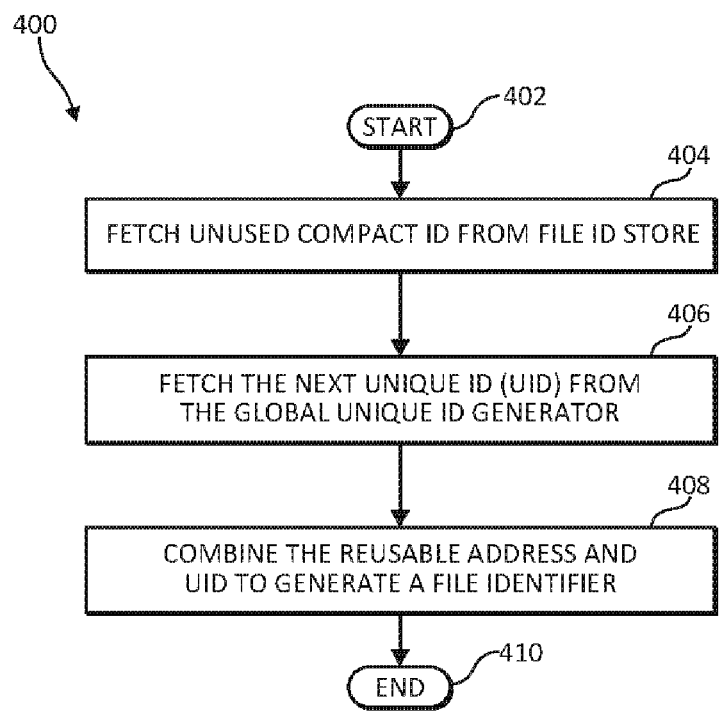
FIG. 4 is a flowchart illustrating an exemplary alternative method for creation of a file identifier in which aspects of the present invention may be realized.

FIG. 4 is a flowchart illustrating an exemplary alternative method for creation of a file identifier in which aspects of the present invention may be realized. The method 400 begins (step 402). The method 400 fetches an unused compact identifier/Identification (ID) from a file ID store (step 404). The method 400 fetches a next unique ID (UID) from a global unique ID generator (step 406). The method 400 combines the compact ID and the unique ID to generate a file identifier (step 408). The method ends (step 410).

Figure 5:
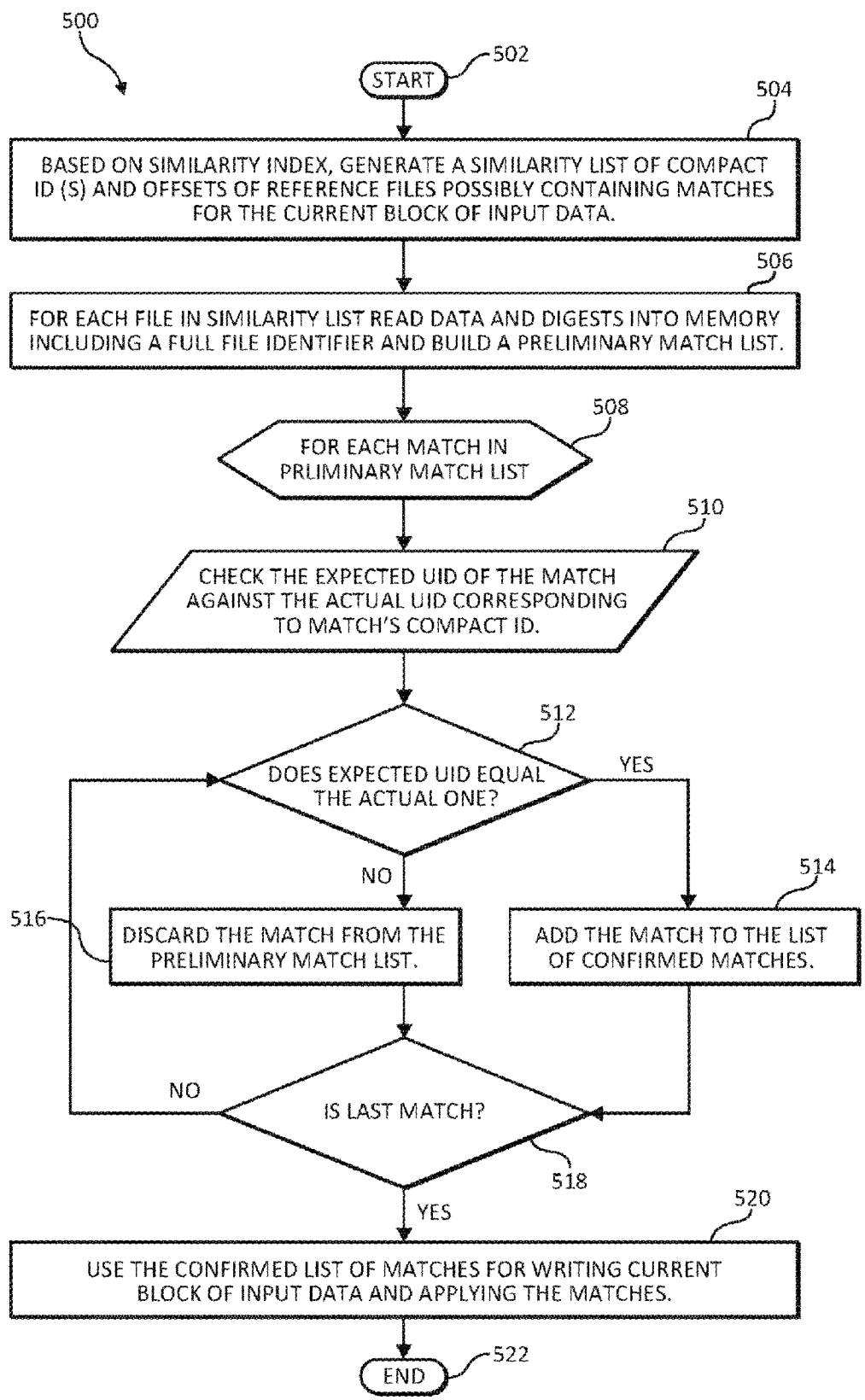
FIG. 5 is a flowchart illustrating an exemplary alternative method usage of a compact ID and a UID of a file identifier in a deduplication process of a block of input data in which aspects of the present invention may be realized.

FIG. 5 is a flowchart illustrating an exemplary alternative method usage of a compact ID and a UID of a file identifier in a deduplication process of a block of input data in which aspects of the present invention may be realized. The method 500 begins (step 502). The method 500, based on a similarity index, generates a similarity list of compact ID's (see FIG. 4) and offsets of reference files possibly containing data matches for the current block of input data (step 504). The method 500, for each file in the similarity list, reads data and digests into memory including a full file identifier and builds a preliminary match list (step 506). The method 500, for each match in the preliminary match list (step 508) checks the expected unique ID (UID) of the match against the actual UID corresponding to the match's compact ID (step 510). The method 500 determines if the expected UID equals the actual UID (step 512). If yes, the method 500 adds the match to the list of confirmed matches (step 514). If no, the method 500 discards the match from the preliminary match list (step 516). From both steps 514 and 516 the method 500 determines if this is the last match (step 518). If yes, the method 500 uses the confirmed list of matches for writing the current block of input data and applies the matches (step 520). If no, the method returns to step 508. The method 500 ends (step 522).

Figure 6:
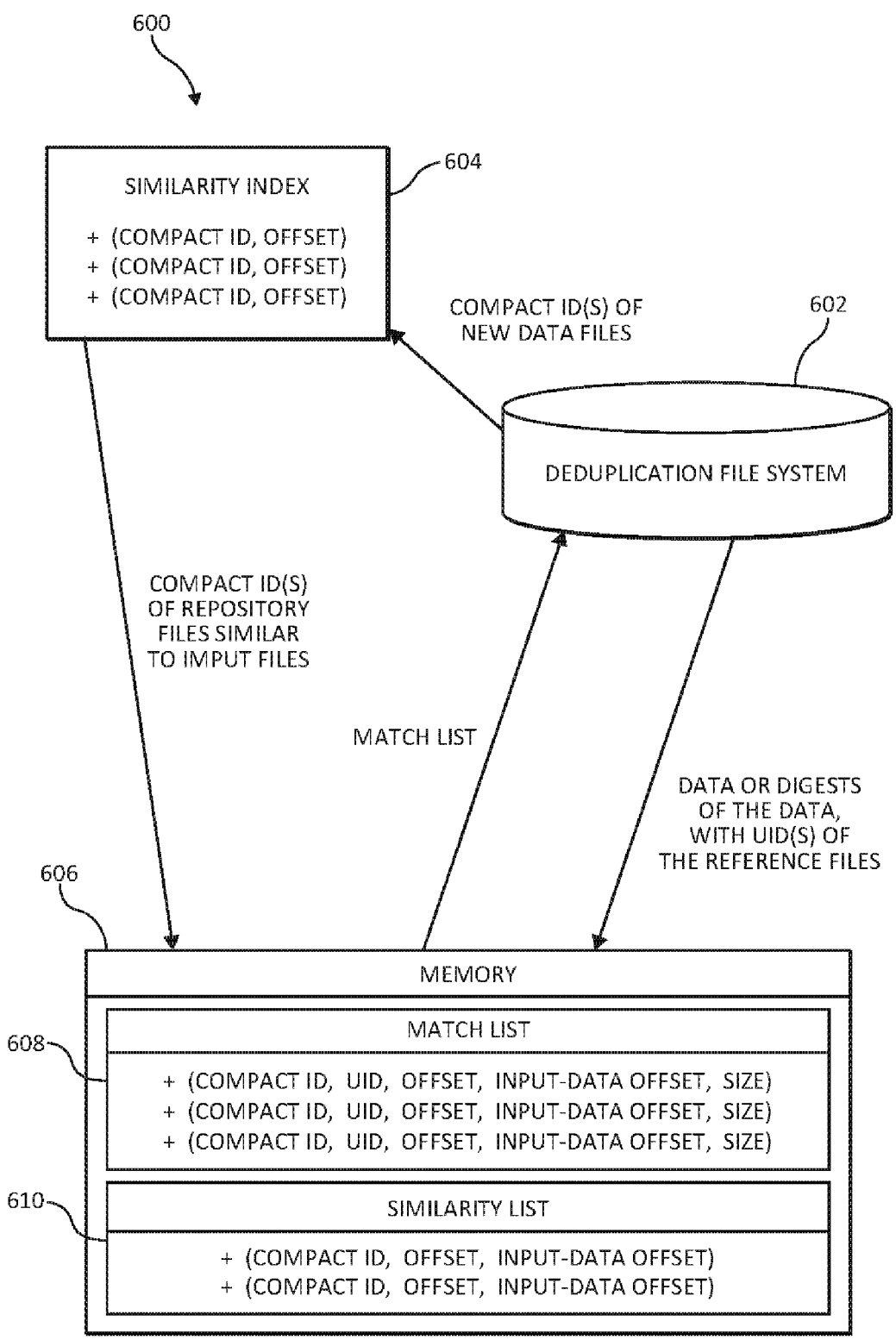
FIG. 6 is a block diagram illustrating an exemplary components for file identifiers in a deduplication system in which aspects of the present invention may be realized.

FIG. 6 is a block diagram 600 illustrating an exemplary components for file identifiers in a deduplication system in which aspects of the present invention may be realized. As illustrated in FIG. 6, each data file in the deduplication file system 602 is associated with a file identifier (see FIG. 3 300). The file Identifier is a combination of a Compact ID and a Unique ID. The Compact ID is a 32-bit integer, which denotes the location of a file in the deduplication file system 602. For the purpose of recycling of Compact ID's, the deduplication file system 602 employs persistent data structure (File ID Store) which includes collections of unused Compact ID(s). The generator of Unique ID(s) is a global persistent counter that is incremented by a value of one in order to create a new UID. The width of the counter (64 bits) is large enough to make the generated ID's practically unique.

In the process of deduplication of a block of input data (See FIG. 5), a similarity list 610 is maintained in memory 606. The similarity list 610 is built based on the content of a similarity index 604, and contains Compact IDs of files and offsets within the files that contain blocks of data similar to the current block of input data. Based on the similarity list 610, reference data and digests are read from deduplication file system 602 into memory 606, and a preliminary match list 608 is built. The preliminary match list 608 contains offsets and full file IDs of data files that are expected to contain matches for the current block of input data. The match list 608 is preliminary at the point of referencing because reference files may be deleted and their Compact IDs may be reused during the process of generating matches based on data or digests loaded in memory. The preliminary match list 608 is passed to deduplication file system 602 for verification and referencing.

For each match, the unique ID stored in memory associated with the match is verified against the unique ID of the data file referenced by the match via its corresponding Compact ID. If the unique ID stored in memory (i.e. the expected unique ID) of the match equals the unique ID of the data file (i.e. the actual unique ID) referenced by the compact ID of the match, then the match is added to the list of confirmed matches. In case the expected unique ID of a match does not equal the actual unique ID, the match is discarded, to avoid creation of false data matches and data corruption. For each match in the confirmed list of matches, deduplication file system protects its reference file from deletion and recycling of the Compact ID for the duration of the process of applying the matches. The process of applying the matches achieves deduplicated storage of the input data.

In one embodiment, by way of example only, the preliminary match list 608 is being built in memory 606. It is built in two stages: (1) similarity search and (2) comparison of data or digests of the data. In stage (1) the present invention searches within the similarity index 604 to find files already existing in the deduplication file system 602 that contain data which is similar to the input data. The output of stage (1) is a similarity list 610 which contains Compact IDs (see also FIG. 3 302) of files and offsets within those files which contain intervals of data similar to the input data. In stage (2) the present invention calculates matches of identical data between the sections of repository data specified by the similarity list 610 and the input data. This process involves reading from the deduplication file system 602 data and/or digests of the data specified by the similarity list 610. When data and/or digests of the data are loaded into memory, the present invention also stores in memory 606 the unique ID of the data file from which this information (data and/or digests) was loaded into memory. The present invention builds the match list 608 by comparing the data and/or digests of the current block to the data and/or digests loaded in memory based on the similarity list 610. This process results in a list of matches that contain data identical to the current block of input data (or parts of it). The current block of input data is stored in the deduplication file system, using the matches to reference repository data. For this purpose, the present invention opens the files reference by the match list using the Compact IDs of the match list 608. At this point the present invention verifies that the unique IDs of the opened files are identical to the unique IDs (see also FIG. 3 304) stored with the matches 608 in memory. This is because the files whose data and/or digests of the data were used for calculating the matches (stage 2) could have been deleted and their Compact IDs recycled. The present invention prevents application of incorrect data matches when storing input data in a deduplication system, by ensuring that applied matches are valid.

Thus, as described herein, in one embodiment, the present invention provides identifiers to data files in a data deduplication system using a processor device in a computing environment. In one embodiment, by way of example only, the present invention associates a data file in the data deduplication system with a file identifier defined to have a first part identifier for denoting a location of the data file in a storage, and a second part identifier for uniquely identifying the data file in the data deduplication system over time.

In one embodiment, the present invention defines the first part to be compact, and reuses identifiers of the first part, previously associated with files that were deleted, for new files. The first part identifiers are stored in a similarity index, and the first part identifiers are used to read information from files to be used in a deduplication process. In one embodiment, the present invention obtains the second part identifiers of the files being accessed, and stores these second part identifiers in memory, associated with the deduplication matches produced using the information obtained from the files. The second part identifiers associated with the deduplication matches are verified against the second part identifiers of the files specified by the first part identifiers, prior to using the deduplication matches for deduplicated storage of the input data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for providing identifiers to data files in a data deduplication system using a processor device in a computing environment, comprising:
   associating a data file in the data deduplication system with a file identifier defined to have a first part identifier for denoting a location of the data file in a storage, and a second part identifier for uniquely identifying the data file in the data deduplication system over time;
   defining the first part identifier to be compact to form a compact identifier;
   reusing compact identifiers of first part identifiers associated with deleted data files for new data files;
   storing the first part identifier in a similarity index; and
   using the first part identifiers to read information from the data files to be used in a deduplication process.

2. The method of claim 1, further including obtaining second part identifiers of the data files being accessed, and storing the second part identifiers in memory associated with deduplication matches produced using information obtained from the data files.

3. The method of claim 2, further including verifying the second part identifiers associated with the deduplication matches against the second part identifiers of the data files specified by the first part identifiers prior to using the deduplication matches for deduplicated storage of the input data.

4. The method of claim 1, further including attaching the second part identifier to data matches calculated using one of reference data and reference digests.

5. The method of claim 1, further including performing each one of:
   selecting an unused first part identifier that is available from a file identifiers store,
   generating the second part identifier using a counter, and
   combining the first part identifier and the second part identifier to generate the file identifier.

6. The method of claim 1, further including performing one of:
   calculating a list of files in the data deduplication system, wherein files in the list of files contain data similar to input data,
   defining the list of files to contain first part identifiers,
   loading into memory information from the files in the list of files, wherein the information includes second part identifiers of the files in the list of files,
   calculating data matches for the input data using the information loaded into the memory from the files in the list of files,
   reading for each one of the calculated data matches the second part identifier associated with a file referenced by the first part identifier recorded in a data match,
   comparing the second part identifier stored in memory for each one of the calculated data matches with the second part identifier associated with the file referenced by the first part identifier recorded in the data match,
   discarding the data match if the second part identifier stored in the memory for the data match does not equal the second part identifier associated with the file referenced by the first part identifier recorded in the data match,
   retaining the data match if the second part identifier stored in memory for the data match equals the second part identifier associated with the file referenced by the first part identifier recorded in the data match,
   applying the retained data matches to store the input data, and
   protecting a reference file from one of deletion and recycling of the first part identifier while applying retained data matches.

7. A system for providing identifiers to data files in a data deduplication system of a computing environment, the system comprising:
   the data deduplication system; and
   at least one processor device operable for controlling the data deduplication system, wherein the at least one processor device:
      associates a data file in the data deduplication system with a file identifier defined to have a first part identifier for denoting a location of the data file in a storage, and a second part identifier for uniquely identifying the data file in the data deduplication system over time,
      defines the first part identifier to be compact to form a compact identifier,
      reuses compact identifiers of first part identifiers associated with deleted data files for new data files,
      stores the first part identifier in a similarity index, and
      uses the first part identifiers to read information from the data files to be used in a deduplication process.

8. The system of claim 7, wherein the at least one processor device obtains second part identifiers of the data files being accessed, and storing the second part identifiers in memory associated with deduplication matches produced using information obtained from the data files.

9. The system of claim 8, further including verifies the second part identifiers associated with the deduplication matches against the second part identifiers of the data files specified by the first part identifiers prior to using the deduplication matches for deduplicated storage of the input data.

10. The system of claim 7, wherein the at least one processor device attaches the second part identifier to data matches calculated using one of reference data and reference digests.

11. The system of claim 7, wherein the at least one processor device performs each one of:
selecting an unused first part identifier that is available from a file identifiers store,
generating the second part identifier using a counter, and
combining the first part identifier and the second part identifier to generate the file identifier.

12. The system of claim 7, wherein the at least one processor device performs one of:
calculating a list of files in the data deduplication system, wherein files in the list of files contain data similar to input data,
defining the list of files to contain first part identifiers,
loading into memory information from the files in the list of files, wherein the information includes second part identifiers of the files in the list of files,
calculating data matches for the input data using the information loaded into the memory from the files in the list of files,
reading for each one of the calculated data matches the second part identifier associated with a file referenced by the first part identifier recorded in a data match,
comparing the second part identifier stored in memory for each one of the calculated data matches with the second part identifier associated with the file referenced by the first part identifier recorded in the data match,
discarding the data match if the second part identifier stored in the memory for the data match does not equal the second part identifier associated with the file referenced by the first part identifier recorded in the data match,
retaining the data match if the second part identifier stored in memory for the data match equals the second part identifier associated with the file referenced by the first part identifier recorded in the data match,
applying the retained data matches to store the input data, and
protecting a reference file from one of deletion and recycling of the first part identifier while applying retained data matches.

13. A computer program product for providing identifiers to data files in a data deduplication system using a processor device in a computing environment, the computer program product comprising a non-transitory computer-readable storage medium having computer-readable program code portions stored therein, the computer-readable program code portions comprising:
a first executable portion that associates a data file in the data deduplication system with a file identifier defined to have a first part identifier for denoting a location of the data file in a storage, and a second part identifier for uniquely identifying the data file in the data deduplication system over time; and
a second executable portion that:
defines the first part identifier to be compact to form a compact identifier,
reuses compact identifiers of first part identifiers associated with deleted data files for new data files,
stores the first part identifier in a similarity index, and
uses the first part identifiers to read information from the data files to be used in a deduplication process.

14. The computer program product of claim 13, further including a third executable portion that obtains second part identifiers of the data files being accessed, and storing the second part identifiers in memory associated with deduplication matches produced using information obtained from the data files.

15. The computer program product of claim 14, further including a fourth executable portion that performs one of:
verifying the second part identifiers associated with the deduplication matches against the second part identifiers of the data files specified by the first part identifiers prior to using the deduplication matches for deduplicated storage of the input data, and
attaching the second part identifier to data matches calculated using one of reference data and reference digests.

16. The computer program product of claim 13, further including a third executable portion that performs each one of:
selecting an unused first part identifier that is available from a file identifiers store,
generating the second part identifier using a counter, and
combining the first part identifier and the second part identifier to generate the file identifier.

17. The computer program product of claim 13, further including a third executable portion that performs one of:
calculating a list of files in the data deduplication system, wherein files in the list of files contain data similar to input data,
defining the list of files to contain first part identifiers,
loading into memory information from the files in the list of files, wherein the information includes second part identifiers of the files in the list of files,
calculating data matches for the input data using the information loaded into the memory from the files in the list of files,
reading for each one of the calculated data matches the second part identifier associated with a file referenced by the first part identifier recorded in a data match,
comparing the second part identifier stored in memory for each one of the calculated data matches with the second part identifier associated with the file referenced by the first part identifier recorded in the data match,
discarding the data match if the second part identifier stored in the memory for the data match does not equal the second part identifier associated with the file referenced by the first part identifier recorded in the data match,
retaining the data match if the second part identifier stored in memory for the data match equals the second part identifier associated with the file referenced by the first part identifier recorded in the data match,
applying the retained data matches to store the input data, and
protecting a reference file from one of deletion and recycling of the first part identifier while applying retained data matches.

* * * * *